3,286,550
HYPOCYCLIC SPEED REDUCERS

Claude Rosain, 50 Rue Raynouard, and Georges Stcherbatcheff, 29 Ave. de la Bourdonnais, both of Paris, France
Filed Apr. 2, 1963, Ser. No. 270,045
Claims priority, application France, Apr. 19, 1962, 895,129
1 Claim. (Cl. 74—798)

The invention relates to a speed reducer which comprises first and second elements; means for mounting said elements in hypocyclic relationship and for driving the second of said elements from an input shaft in rolling engagement for relative rotation with respect to the first of said elements and a flexible coupling connecting said second element to an output shaft.

In such a speed reducer, the output low speed motion is thus taken on a "floating" element which has no fixed axis and to which a rolling motion is imparted.

Transmission to the output shaft of the vibrating component of the hypocyclic motion of said rolling element is prevented by the flexible coupling.

It is an object of the invention to provide said speed reducer with a coupling which is particularly adapted rigidly to transmit to the output shaft the torque provided by the motion of the rolling element, whereas it can with great resiliency undergo flexing stresses under the action of other displacements of the rolling element than the rotation thereof, such as vibrations referred to above.

According to the invention, said coupling comprises two pairs of elongated spring means which are rigid in so far as compression and pulling strains are concerned and resilient in so far as flexing strains are concerned, said spring means respectively having first and second ends; said first ends of one pair of spring means being associated with two diametrically opposed points of said second element; a bar having a median portion rigidly connected to said shaft, said bar having two ends, said first ends of the other pair of spring means being connected to said ends; and a rigid plate having two pairs of diagonally opposed corners: the second ends of the respective pairs of spring means being connected to the respective pairs diagonally opposed corners.

With this and other objects in view, the invention resides in the combinations, arrangements and functional relationships of elements as set forth in the following specification and particularly pointed out in the appended claim.

Figure 1:
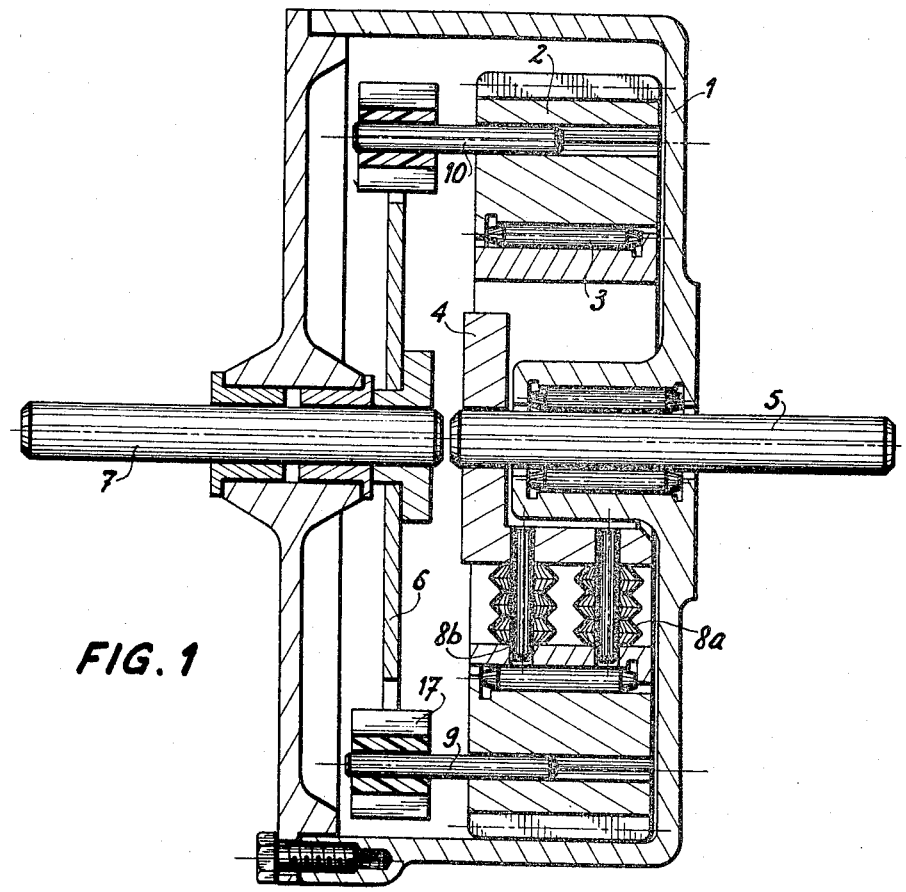
Figure 2:
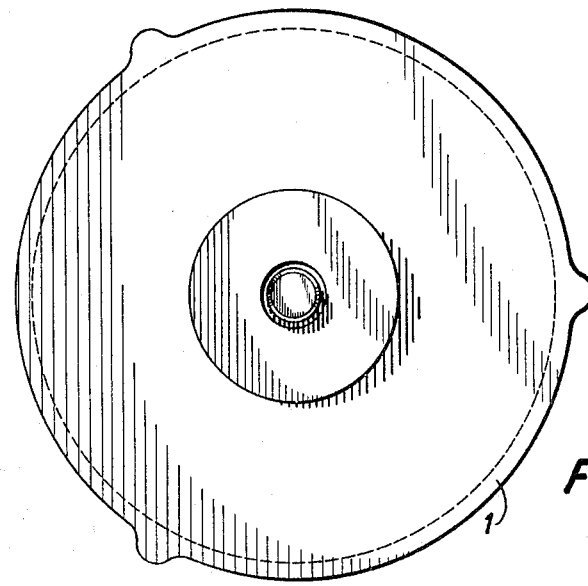
Figure 3:
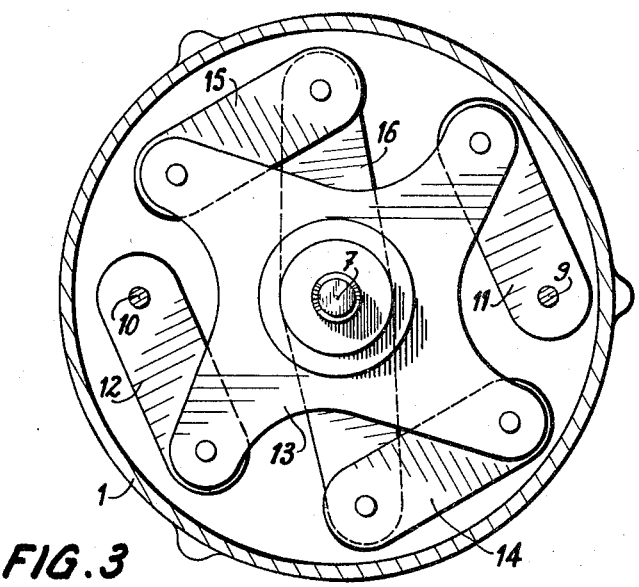

In the accompanying drawings:
FIGURE 1 is a sectional view of a speed reducer embodying this invention; of which
FIGURE 2 is a front elevation;
FIGURE 3 shows a preferred embodiment of the coupling unit of the reducer; and
FIGURE 4 is a partial view of the reducer, with its coupling unit removed.

The reducer as illustrated in the drawings comprises a first element or stator 1 containing in its inner part a second element 2 which is adapted for rolling motion, without slipping with respect to the first element; means for driving this rolling element 2 from the input shaft 5 and to flexibly maintain this rolling element on its roller track in the internal part of stator 1; and a flexible coupling 6 transmitting to the output shaft 7 the useful component, that is the rotational torque, of the hypocyclic motion of the rolling element.

Figure 4:
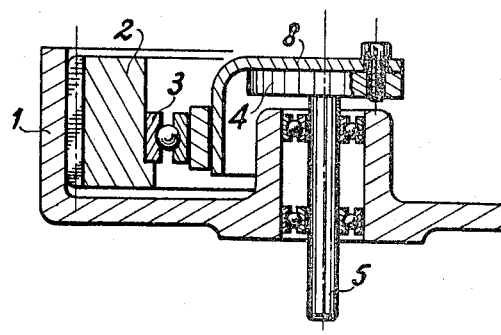

Said means for driving the rolling element comprise a member 4 secured to the input shaft 5 and spring means 8 (FIGURE 1 or 4). In the embodiment illustrated in FIGURE 1, said spring means are composed of resilient washers such as those represented in 8a, filed on assembling studs such as represented in 8b and of a roller bearing 3 which transmits to the rolling element 2 the bearing force exerted by the spring 8.

The motion of the rolling element is transmitted to the coupling by two rods 9 and 10 (FIGURES 1 and 3), not shown in FIGURE 4.

A preferred embodiment of the coupling unit is illustrated in FIGURE 3. As shown in FIGURE 3, the outer ends of the rods 9 and 10 (i.e. the ends which are not secured to the rolling element 2) are connected by means of hinged connections to two leaves 11 and 12 respectively.

Leaves 11 and 12 are in turn connected in two opposed corners of a rigid plate 13 by means of hinged connections. Two further leaves 14 and 15 respectively are connected by means of hinged connections to the two remaining corners of plate 13; the other ends of leaves 14 and 15 are connected, by means of hinged connections, to a lever 16, which is integrally connected to the output shaft 7.

In FIGURE 1 has been shown for the sake of clarity a simplified form of this coupling unit. It is to be understood, however, that the speed reducer of FIGURE 1, in its preferred embodiment, will comprise a coupling unit of the type shown in FIGURE 4.

Now the operation of the device will be more particularly discussed with reference to said preferred embodiment.

It is clear that the rotation of the input shaft 5 has the effect of driving the rolling element 2, which, being flexibly maintained in permanent contact with the internal periphery of stator 1 along one generatrix thereof, effects a hypocyclic motion.

It may be shown that such a hypocyclic motion of the rolling elements 2 may decompose into a rotation around its axis, at a constant angular speed $\Omega = \omega r/R$, $\omega$ being the angular speed of the input shaft 5, R the clearance radius of the rolling element, and $r$ the difference $R'-R$, $R'$ being the internal radius of the stator, and into a parasitic vibration having an amplitude $r$ and a frequency $\omega$.

It may also be shown that the useful torque of the rotation is transmitted with a great rigidity to the output shaft by means of the coupling unit which has been described hereinabove.

On the other hand, this coupling unit provides a flexible suspension of the rolling element with respect to any other motion and particularly with respect to the parasitic vibration mentioned hereinabove.

Finally, the output shaft 7 rotates with a constant angular speed $\Omega$ which is considerably lower than $\omega$, provided that the clearance $r$ between the rolling element and its roller track in the stator be sufficiently small with respect to R. For instance, if one takes $r=1$ and $R'=50$, a speed ratio of 50 is achieved.

It may be shown that the position of the centre of gravity of the rolling element 2 is, at every instant, bound to that of the bearing member 4, according to a law which does not depend on the torque.

The want of balance resulting from the motion of this centre of gravity can, therefore, be overcome by suitably shaping member 4.

Of course, it is possible for those skilled in the art to imagine, without departing from the scope and spirit of this invention, a large number of variations of modifications of the arrangements described and illustrated herein.

What we claim is:
A hypocyclic speed reducer comprising: first and second elements; means for mounting said elements in hypo- cyclic relationship and for driving the second of said elements from an input shaft in rolling engagement for relative rotation with respect to the first of said elements and a flexible coupling connecting said second element to an output shaft, said flexible coupling comprising: two pairs of elongated spring leaves which are rigid insofar as compression and pulling strains are concerned and resilient insofar as flexing strains are concerned, said spring leaves respectively having first and second ends; said first ends of one pair of spring being associated with two diametrally opposed points of one of said rollers; a bar having a median portion rigidly connected to said shaft, said bar having two ends, said first ends of the other pair of springs being connected to said ends; and a rigid plate having two pairs of diagonally opposed corners, said second ends of each pair being connected to diametrally opposed corners.

References Cited by the Examiner

UNITED STATES PATENTS

| | | | |
|---|---|---|---|
| 885,354 | 4/1908 | Loguin | 74—798 |
| 1,893,593 | 1/1933 | Oechsle | 64—12 |
| 2,293,407 | 8/1942 | Schirrmeister | 74—798 |
| 2,430,449 | 11/1947 | Brown | 64—12 |
| 2,580,781 | 1/1952 | Hoffer | 64—12 |
| 2,653,457 | 9/1953 | Guernsey et al. | 64—12 |
| 2,831,373 | 4/1958 | Weis | 74—798 |
| 3,004,453 | 10/1961 | Lang | 74—798 |
| 3,020,782 | 2/1962 | Sacchi | 74—796 |
| 3,043,164 | 7/1962 | Sundt | 74—804 |

DAVID J. WILLIAMOWSKY, *Primary Examiner.*

DON A. WAITE, *Examiner.*

T. C. PERRY, *Assistant Examiner.*